455-296 SR X 5687H
FIP8106 XR 3,037,114 X 5494H
SEARCH ROOM
May 29, 1962 D. BIER ET AL 3,037,114
SWITCHING CIRCUIT
Filed Oct. 19, 1959
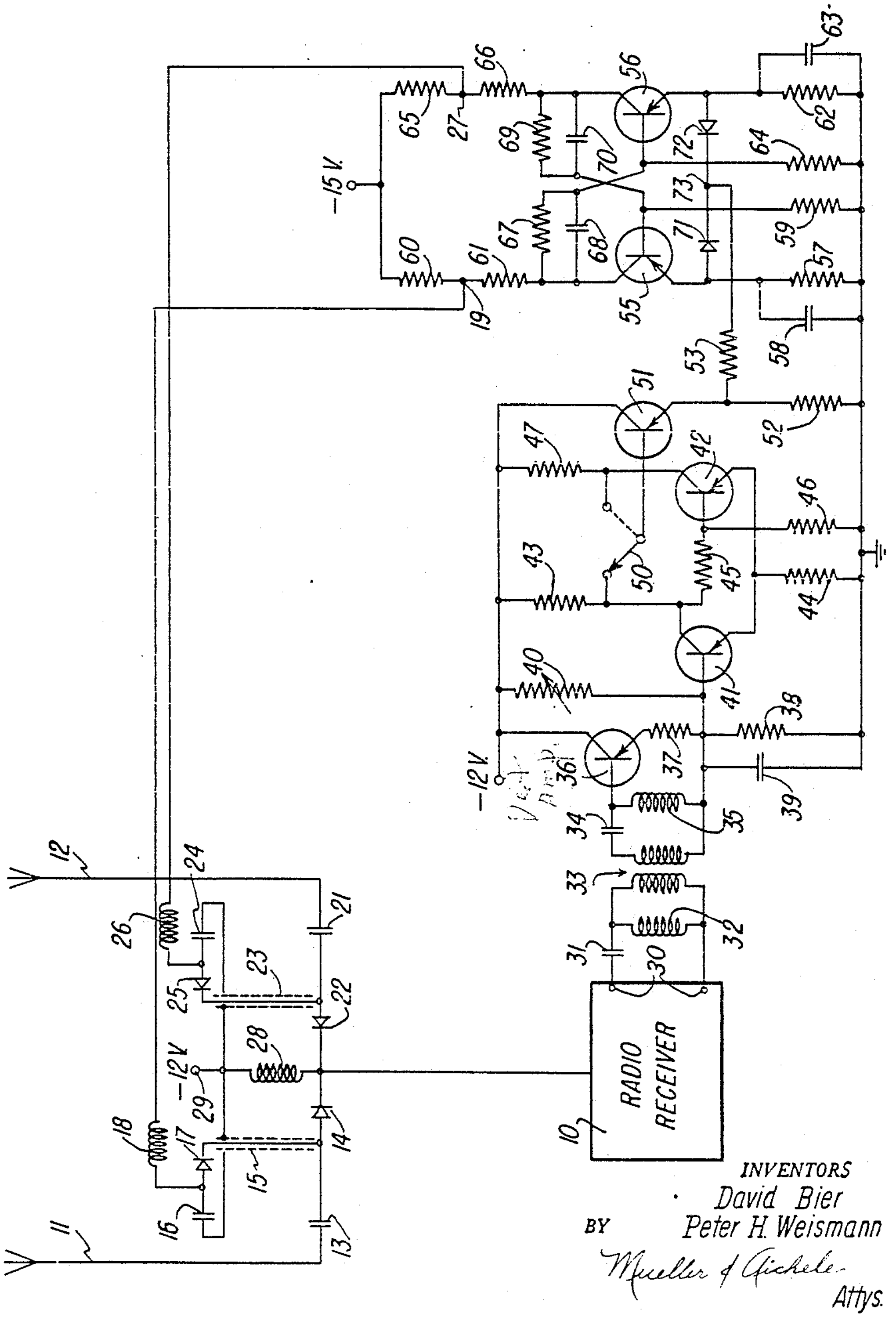
INVENTORS
David Bier
Peter H. Weismann
BY Mueller & Aichele
Attys.

3,037,114

SWITCHING CIRCUIT

David Bier, Chicago, and Peter H. Weismann, Des Plaines, Ill., assignors to Motorola, Inc., Chicago, Ill., a corporation of Illinois Filed Oct. 19, 1959, Ser. No. 847,243
6 Claims. (Cl. 250—20)

This invention relates generally to two-state switching circuit and more particularly to a two-stage transistor multivibrator circuit which responds to a control signal to act either as a free running (astable) circuit, or as a bistable circuit.

Multivibrator circuits are used in many applications to provide switching action, and such circuits have the advantage of very rapid response. In some applications it is desired to have a free running multivibrator circuit which switches back and forth between its two states at a regular rate, and which can also be operated as a bistable circuit which remains in one of its stable states until a predetermined condition takes place.

One application for such a circuit is in a diversity receiving system in which a receiver is selectively connected to one of a plurality of antennas. In such a system it is desired that switching take place as soon as the signal fades and that the switching time is very short so that no part of the signal is lost. A multivibrator circuit may be used to switch back and forth between two antennas, and when a strong signal is received the circuit should preferably operate in a bistable manner to hold connected the antenna which provides the signal until the signal fades. Such a circuit may also be used in many other applications.

It is therefore an object of the present invention to provide an improved two state transistor switching circuit.

Another object of the invention is to provide a switching circuit which alternately switches between two states, and which is latched in response to a control signal so that it is stable in either state in which it is until the control signal changes.

A further object of the invention is to provide a system which responds to a signal of a particular level to provide controlled switching action.

A feature of the invention is the provision of a two state circuit formed by two transistor stages interconnected to operate as a free running multivibrator, with a latching circuit connected to the two stages and causing the same to operate as a bistable circuit in response to the application of a control signal to the latching circuit.

A further feature of the invention is the provision of a latching multivibrator circuit for selectively providing control potentials and having two transistor stages, with a latching circuit formed by back-to-back diodes interconnecting the stages to form a bistable circuit when current is applied to the common terminal between the diodes, and to form a free running multivibrator circuit when such current is not applied to the common terminal. The latching circuit may be connected to the emitters of the transistors to apply current to the emitter impedance of the transistor which is cut off to prevent discharge of the capacitor in the emitter impedance and thereby hold this transistor cut off.

Another feature of the invention is the provision of a control system including a Schmitt trigger circuit which responds to a voltage of a predetermined level, coupled to the latching multivibrator circuit for applying a control signal to the latching circuit thereof so that the multivibrator operates either in a free running manner, or as a bistable circuit, depending upon the level of the signal applied to the Schmitt circuit.

The invention is illustrated in the accompanying drawing wherein the single FIGURE shows the two state circuit used in a system for selectively connecting two antennas to a receiver.

In practicing the invention, a multivibrator circuit is provided which includes two transistor stages connected to operate normally in a free running manner. A latching circuit with back-to-back diodes is connected to the circuit for holding the same in a bistable condition. When current is applied to the junction between the diodes of the latching circuit, the circuit is stable in either state. When no current is applied free running action takes place with the stage alternately conducting. The latching circuit is controlled by current fed from an emitter follower circuit which is in turn controlled by a Schmitt trigger circuit. The Schmitt trigger circuit responds to a particular voltage level to cause conduction of the emitter follower circuit. A switch may be provided to cause operation at different levels by connection to one or the other stage of Schmitt trigger circuit.

The two state circuit may be used in a diversity receiving system to selectively apply signals to a frequency modulation receiver from two antennas. The antennas are each connected to the receiver through a circuit coupled to one of the transistor stages so that the stage controls the connection of the antenna to the receiver. The latching circuit may be controlled by a circuit including a detector responding to noise at the audio output of the receiver so that when substantial noise is received with a weak signal, a control voltage is provided. The control voltage is applied to the Schmitt trigger circuit. When the control voltage is reduced as the noise reduces with a strong signal, the Schmitt trigger circuit changes states and the emitter follower circuit applies current to the latching circuit to hold the multivibrator in a stable condition.

Referring now to the drawing, there is illustrated a frequency modulation receiver 10 to which signals are applied by antennas 11 and 12. The antenna 11 is coupled to the receiver through capacitor 13 and diode 14. Connected between capacitor 13 and diode 14 is a transmission line 15 of a length to form a quarter wave stub at the frequency being received, and shorted by diode 17. Capacitor 16 serves as a blocking capacitor and may also be used for precisely tuning the stub. A switching circuit for biasing the diodes 14 and 17 conductive extends through choke 18 from the terminal 19. When the diodes are back biased the diode 14 presents a substantial impedance to the signal from antenna 11, and the diode 17 open circuits the remote end of the transmission line or stub so that the end connected to the antenna input line is effectively shorted to the —12 volt terminal through the outer conductor of the transmission line 15. The —12 volt terminal forms a reference or ground potential point for signal voltages. This decouples the antenna 11 from the receiver 10. When the diodes are forward biased, the diode 17 shorts the transmission line so that the end connected to the antenna input line is open, and the diode 14 provides a low impedance connection to effectively connect antenna 11 to the receiver 10.

Similarly the antenna 12 is coupled to the receiver 10 through capacitor 21 and diode 22. Transmission line 23 forms a quarter wave stub connected between capacitor 21 and diode 22, and is shorted by diode 25. Capacitor 24 serves to block direct current and may be used for tuning similarly to capacitor 16. A switching circuit extends through choke 26 from the point 27. The antenna 12 is connected to the receiver 10 when the diodes are forward biased and is isolated therefrom when the diodes are back biased in the same manner as described above for antenna 11. A coil 28 is connected to a negative potential at terminal 29 to complete the switching circuits as will be further described.

The audio output of the frequency modulation receiver is derived across terminals 30, with noise appearing with the signal above the modulating frequencies being selected by the high pass filter including capacitor 31 and coil 32. This noise signal is applied through matching transformer 33 to a tuned detector having a series resonant input circuit including capacitor 34 and coil 35. The resonant circuit increases the amplitude of the desired signals, with the stepped up signal across coil 35 being applied to the input circuit of transistor 36. The transistor 36 serves as a detector and amplifier, with the input signal being applied through resistor 37 across the base and emitter electrodes of the transistor. This circuit has the advantage that it has a high alternating current input impedance so that it does not objectionably load the signal source. The transistor input circuit has a high pass filter characteristic which further facilitates the selection of the noise signals. The circuit has good temperature stability as the direct current impedance of coil 35 which forms the base return is low. Resistor 37 is selected to provide large degenerative feedback for both the signal and direct current. The detected output of the transistor 36 appears across resistor 38 bridged by capacitor 39 to provide the desired time constant. The output impedance is low and this facilitates coupling to the base of the next transistor.

The detector output is applied to a voltage level sensing device and for this purpose the Schmitt trigger circuit including transistors 41 and 42 is provided. The detector output is applied through resistor 44 across the base and emitter electrodes of the transistor 41. The base electrode of the transistor 41 is connected to the bias potential through adjustable resistor 40 which sets the level at which the trigger circuit will operate. The collector electrode of transistor 41 is connected through resistor 43 to the negative source potential and through resistor 45 to the base of transistor 42, which in turn is connected to ground through resistor 46. The collector of transistor 42 is connected to the negative source potential through resistor 47, and the emitter of this transistor is connected to the emitter of transistor 41.

The output of the trigger circuit is taken from one of the collectors of transistors 41 and 42 by a switch 50. This is shown connected to the collector of transistor 41, but may be switched to the collector of transistor 42 as shown by the dotted line. The switch 50 applies a control potential to the base of transistor 51 which is connected to form an emitter follower, with the emitter being connected to ground through resistor 52 and the collector being connected to the bias potential. Resistor 53 applies a current from the emitter to the latching multivibrator in accordance with the control potential applied to the base of transistor 51.

For switching the antennas to the receiver input the two-state switching circuit in accordance with the invention is provided. This includes transistors 55 and 56 connected to provide two coupled stages. The emitter of transistor 55 is connected to ground by resistor 57 which is bypassed by capacitor 58. The base of transistor 55 is connected to ground through resistor 59. The collector of transistor 55 is connected to a negative potential through resistors 60 and 61. Similarly transistor 56 has its emitter connected to ground through resistor 62 bypassed by capacitor 63, and its base connected to ground through resistor 64. The collector is connected to the negative potential through resistors 65 and 66. The collector of transistor 55 is coupled to the base of transistor 56 by resistor 67, bypassed by capacitor 68, and the collector of transistor 56 is coupled to the base of transistor 55 by resistor 69, bypassed by capacitor 70.

The circuit including transistors 55 and 56 which has been described forms a free running multivibrator wherein the stages alternately conduct. To provide latching action, a circuit including diodes 71 and 72 with a common terminal 73 therebetween is connected between the emitters of transistors 55 and 56. The diodes are connected so that current from terminal 73 will flow therethrough to the emitter resistors. When sufficient current flows from terminal 73 through this circuit, the two stages act as a bistable circuit with either stage remaining conducting. The diodes 71 and 72 act as switches to divert the bias current flowing from transistor 51 to the emitter resistor of whichever transistor is cut off and this holds the transistor stages in a bistable condition.

Assuming that the transistor 55 is conducting and the transistor 56 is cut off, the transistor 56 will remain cut off until capacitor 68 and capacitor 63 discharge. When these capacitors discharge, the potential between the emitter and base of transistor 56 will permit this transistor to conduct. This will cut off transistor 55 and the two transistors will conduct alternately as a free running multivibrator. When transistor 51 conducts, current will flow through resistor 53 to the junction of diodes 71 and 72. When the transistor 55 is conducting the current flows through diode 72 to prevent discharge of capacitor 63 and thereby maintain the potential across the emitter resistor 62 to hold the transistor 56 cut off. Similarly, if transistor 56 is conducting, current through resistor 53 will pass through diode 71 to resistor 57 of transistor 55 to maintain the emitter potential and hold this transistor cut off. When the diode 72 (or 71) ceases to conduct, capacitor 63 (or 58) discharges to ground causing transistor 56 (or 55) to saturate. The diode 71 (or 72) not conducting to provide the action described above may, also conduct to a lesser extent to provide better performance, such as increased stability, in a particular application.

In order for the latching action to take place, the latching current should be applied through the diodes 71 and 72 to the emitters during the first portion of the transition period. That is, to hold transistor 55 cut off, the latching current must be applied soon after transistor 55 is cut off and before the capacitor 58 discharges to a great extent. With proper design, latching action can take place over a substantial portion of the time during which transistor 55 would be cut off in the free running condition. The actual portion of the cut off period during which latching action can take place will depend upon the particular circuit used.

When the rectified noise voltage applied to the transistor 41 is not sufficient to cause this transistor to conduct, as when a strong signal is received, the collector electrode will be approximately at the potential of the negative source. The base of transistor 51 which is connected through switch 50 to the collector of transistor 41 will be at this negative potential so that the transistor 51 supplies relatively heavy emitter current which is adequate to maintain the voltage at the emitter of either transistor 55 or 56, whichever is cut off. However, when the noise voltage increases so that the transistor 41 saturates, the collector current will cause a voltage drop across resistor 43 so that the voltage applied to the base of transistor 51 is greatly reduced. In this condition the transistor will not supply sufficient bias current through the diodes 71 and 72 and the diodes will in effect open the circuit between the emitters of transistors 55 and 56 to cause the free running multivibrator action referred to above.

Considering now the action of the transistors 55 and 56 to control the antenna switching circuit, the collector current from transistor 55 flows through resistor 61 to point 19 and through diodes 17 and 14 to the minus 12 volt supply. When the transistor 55 is conducting, saturation current is drawn through the diodes so that they offer little resistance. Similarly when transistor 56 conducts, the collector current flows through resistor 66 to point 27 and through diodes 25 and 22 to the minus supply. Here again when the transistor 56 conducts the diodes offer little resistance. The points 19 and 27 are connected through resistors 60 and 65 respectively to a minus fifteen volt supply and this insures that the diodes of the switching circuit are completely cut off when the transistors do not conduct. This is necessary since the base current of the conducting transistor flows through the collector resistance of the off transistor and would apply some bias to the diodes even when the transistor coupled thereto is cut off.

When transistor 55 is conducting, the diodes 14 and 17 are forward biased so that they have very little resistance, and antenna 11 is connected to the receiver through a low impedance circuit including capacitor 13. Diode 14 offers little resistance, and the diode 17 shorts the transmission line so that the end of the transmission line or stub connected to the antenna circuit is virtually an open circuit and the line does not short out the antenna 11. At the time when diodes 14 and 17 are conducting the diodes 22 and 25 are back biased so that the antenna 12 is effectively isolated from the antenna 11 and from the receiver. The diode 22 offers impedance in the antenna circuit and the diode 25 opens the remote end of the line 23 so that the end connected to the antenna circuit shorts this circuit to the −12 volt terminal which forms a ground or a reference potential point. However, when current flows through diodes 22 and 25 to reduce their impedance, the antenna 12 will be effectively connected to the receiver, and the antenna 11 will be isolated therefrom as at this time diodes 14 and 17 will be back biased.

The switching action between the stages of the multivibrator will be extremely rapid and this will cause extremely rapid switching from one antenna to the other when the signal falls below the predetermined value. The switching time for changing connections from one antenna to the other is negligible.

The following table lists values of components of the two state switching circuit and the Schmitt trigger circuit which have been found to provide satisfactory operation in an actual system which has been used. It is pointed out, however, that these values are merely representative and are not to be considered as limiting the invention, and other values may be preferable in a different application.

| | |
|---|---|
| Resistor 40 | 50 kilohm max. |
| Transistor 41 | type 2N651 |
| Transistor 42 | type 2N651 |
| Resistor 43 | 1.8 kilohm |
| Resistor 44 | 220 ohms |
| Resistor 45 | 6.8 kilohms |
| Resistor 46 | 1.2 kilohms |
| Resistor 47 | 1.8 kilohms |
| Transistor 51 | type 2N651 |
| Resistor 52 | 2.2 kilohms |
| Resistor 53 | 3.3 kilohms |
| Transistor 55 | type 2N651 |
| Transistor 56 | type 2N651 |
| Resistor 57 | 330 ohms |
| Capacitor 58 | .5 microfarad |
| Resistor 59 | 15 kilohms |
| Resistor 60 | 1.5 kilohms |
| Resistor 61 | 2.2 kilohms |
| Resistor 62 | 330 ohms |
| Capacitor 63 | .5 microfarad |
| Resistor 64 | 15 kilohms |
| Resistor 65 | 1.5 kilohms |
| Resistor 66 | 2.2 kilohms |
| Resistor 67 | 12 kilohms |
| Capacitor 68 | .25 microfarad |
| Resistor 69 | 12 kilohms |
| Capacitor 70 | .25 microfarad |
| Diode 71 | transition type SG419 |
| Diode 72 | transition type SG419 |

The two state switching or multivibrator circuit of the invention operates either as a free running circuit wherein it switches between its two states in a regular manner, or as a bistable circuit wherein it remains in either state until the latching action is removed. The multivibrator circuit may be controlled by a trigger circuit such as the Schmitt trigger circuit illustrated to provide a system which responds to a particular voltage level.

Although the circuit is illustrated for use in an antenna switching system, it is obvious that it may be used in many other applications as well. The circuit may be used in any hunting system which responds automatically to a particular voltage level. The circuit may also be used as a pattern generator or as a controlled clock generator. As the circuit responds very rapidly it performs in a highly satisfactory manner in these and other applications.

We claim:

1. A voltage responsive system including in combination a two-state multivibrator circuit having first and second stages each including a transistor having a base, an emitter and a collector, impedance means connecting the emitter of each transistor to a reference potential, means connecting the collector of each transistor to the base of the other transistor to provide multivibrator action, a latching circuit interconnecting said emitters of said transistors and including back-to-back diodes and a common terminal therebetween, said diodes being selectively rendered conducting to apply current from said common terminal to the emitter impedance of the stage which is cut off to hold the same cut off, whereby said stages form a bistable circuit which is held in its existing condition in response to the application of current of a predetermined value to said terminal of said latching circuit, and said stage form a free running circuit in the absence of such current, an emitter follower transistor circuit coupled to said terminal for applying to said latching circuit current of said predetermined value, and a Schmitt trigger circuit coupled to said emitter follower circuit for selectively rendering the same conducting, said trigger circuit responding to a predetermined control voltage to control the current applied to said terminal by said emitter follower circuit, whereby said multivibrator circuit remains stable in response to a control voltage of one value and operates in a free running manner in response to a control voltage of a second value.

2. A voltage responsive system including in combination a two-state switching circuit having first and second stages each including a transistor having a base, an emitter and a collector, impedance means connecting the emitter of each transistor to a reference potential, means connecting the collector of each transistor to the base of the other transistor to provide multivibrator action, a latching circuit interconnecting said emitters of said transistors and including back-to-back diodes and a common terminal therebetween, said diodes being selectively rendered conducting to apply current to the emitter impedance of the stage which is cut off to hold the same cut off, whereby said stages form a bistable circuit which is held in its existing condition in response to the application of current of a predetermined value to said terminal of said latching circuit and form a free running circuit in the absence of such current, current supply means coupled to said terminal for applying to said latching circuit current of said predetermined value, and a trigger circuit coupled to said current supply means for controlling the same, said trigger circuit responding to a predetermined control voltage to control the current applied to said terminal by said current supply means, whereby said switching circuit remains stable in response to a control voltage of one value and operates in a free running manner in response to a control voltage of a second value.

3. In a diversity receiving system including first and second spaced antennas for supplying signals to a receiver, first and second circuit portions individually connected to the first and second antennas and to the receiver and selectively operative for coupling the antennas to the receiver, and means coupled to the receiver for producing a control voltage in response to received signals, a two-state switching circuit including in combination, first and second stages connected to said first and second circuit portions respectively of said switching circuit for selectively rendering the same operative, a latching circuit connected to said stages including a pair of back-to-back diodes and a common terminal therebetween, said diodes being individually connected to said stages, said latching circuit being operative to hold one of the stages conducting in response to the application of a control signal of a predetermined value to said common terminal, said stage which is conducting when said latching circuit operates being held conducting as long as said latching circuit operates, with said first and second stages alternately conducting when the signal falls below said predetermined value, and means responsive to said control voltage for applying to said latching circuit a control signal of said predetermined value in response to received signals, whereby said switching circuit holds one antenna connected or alternately connects the first and second antennas in accordance with the control signal applied to said latching circuit.

4. In a diversity receiving system including first and second spaced antennas for supplying signals to a receiver, first and second circuit portions individually connected to the first and second antennas and to the receiver and selectively operative for coupling the antennas to the receiver, and means coupled to the receiver for producing a control voltage in response to desired received signals, a two-state switching circuit including in combination first and second stages each including a transistor having base, emitter and collector electrodes, impedance means connecting the emitter electrode of each transistor to a reference potential, resistor means connecting the collector electrode of each transistor to potential means, means connecting said resistor means of said first and second stages respectively to said first and second circuit portions to render said portions operative when the stage connected thereto conducts, means connecting the collector electrode of each transistor to the base electrode of the other transistor to provide multivibrator action, and a latching circuit interconnecting said emitter electrodes of said transistors and including first and second diodes connected back-to-back with a common terminal therebetween, said diodes being connected to allow current flow from said common terminal to said emitter impedance means with the diode connected to the stage which is cut off being rendered conducting to apply current through its emitter impedance to hold the same cut off, whereby said stages form a bistable circuit which is held in its existing condition in response to the application of a predetermined current to said terminal of said latching circuit and forming a multivibrator circuit in the absence of such current, and means responsive to the control voltage for applying to said latching circuit current of said predetermined value in response to a desired signal, whereby said multivibrator holds the antenna providing the desired signal connected until an undesired signal is received and then acts to alternately connect the first and second antennas to the receiver until a desired signal is received.

5. A transistor multivibrator circuit including first and second stages each including a transistor having base, emitter, and collector electrodes, first and second impedance means individually connecting said emitter electrodes of said transistors to a reference potential, means connecting said collector electrode of each transistor to said base electrode of the other transistor to provide multivibrator action, a single signal input terminal, first diode means connected between said input terminal and said emitter electrode of one of said transistors to provide a unidirectional current path therebetween so that a control signal applied to said input terminal concurrently with nonconduction of said one transistor holds the same in said nonconducting state, and second diode means connected between said single signal input terminal and said emitter electrode of the other one of said transistors to provide a unidirectional current path therebetween, so that a control signal applied to said input terminal concurrently with nonconduction of said other transistor holds the same in said nonconducting state, whereby said multivibrator is held in a selected bistable state in the presence of said control signal, and remains in a free-running condition in the absence of said control signal.

6. A two-state switching circuit including first and second transistor stages, each of said stages including a transistor having base, emitter, and collector electrodes, a resistor and capacitor in parallel connecting said emitter electrode of each transistor to a reference potential, means connecting said collector electrode of each transistor to said base electrode of the other transistor to provide multivibrator action, and a latching circuit including a single signal input terminal, first and second diodes having electrodes connected to said input terminal in back-to-back relationship, and means connecting the other electrode of each diode individually to the emitter electrode of one of said transistors, said diodes being selectively rendered conducting in response to a predetermined signal at said signal input terminal to apply current to the emitter electrode of the stage which is nonconducting to hold the capacitor connected thereto charged so that said stage remains nonconducting, whereby said stages form a bistable circuit which is held in its existing condition in response to the application of a predetermined signal to said input signal terminal of said latching circuit, and form a free running multivibrator in the absence of said predetermined signal.

References Cited in the file of this patent

UNITED STATES PATENTS

| | | |
|---|---|---|
| 2,478,683 | Bliss | Aug. 9, 1949 |
| 2,665,845 | Trent | Jan. 12, 1954 |
| 2,685,643 | Fisk et al. | Aug. 3, 1954 |
| 2,877,451 | Williams | Mar. 10, 1959 |
| 2,898,455 | Hymas et al. | Aug. 4, 1959 |
| 2,921,192 | Casey et al. | Jan. 12, 1960 |